(12) United States Patent
Prochaska et al.

(10) Patent No.: US 8,966,289 B2
(45) Date of Patent: Feb. 24, 2015

(54) PAIRING OF ANGLE SENSOR AND ELECTRONIC CONTROL UNIT

(75) Inventors: Marcus Prochaska, Pattensen (DE); Nils Kolbe Kolbe, Winsen (DE)

(73) Assignee: NXP B.V., Eindhoven (NL)

( * ) Notice: Subject to any disclaimer, the term of this patent is extended or adjusted under 35 U.S.C. 154(b) by 425 days.

(21) Appl. No.: 12/972,000

(22) Filed: Dec. 17, 2010

(65) Prior Publication Data

US 2012/0155645 A1    Jun. 21, 2012

(51) Int. Cl.
*G06F 21/00* (2013.01)
*H04L 29/06* (2006.01)
*H04L 9/12* (2006.01)

(52) U.S. Cl.
CPC ............. *H04L 63/0435* (2013.01); *H04L 9/12* (2013.01)
USPC ............................................. 713/194; 726/34

(58) Field of Classification Search
CPC .............................. H04L 9/12; H04L 63/0435
USPC ................................ 713/194; 377/20; 726/34
See application file for complete search history.

(56) References Cited

U.S. PATENT DOCUMENTS

| | | | |
|---|---|---|---|
| 6,483,296 B1 * | 11/2002 | Hamaoka et al. | 324/207.25 |
| 7,914,024 B2 | 3/2011 | Lohmuller et al. | |
| 2003/0194088 A1 | 10/2003 | Fischer et al. | |
| 2003/0218458 A1 * | 11/2003 | Seger et al. | 324/303 |
| 2005/0175184 A1 * | 8/2005 | Grover et al. | 380/278 |
| 2008/0159467 A1 * | 7/2008 | Kassner | 377/20 |
| 2009/0051135 A1 | 2/2009 | Lohmuller et al. | |
| 2009/0235303 A1 | 9/2009 | Yamaoka et al. | |
| 2010/0211787 A1 | 8/2010 | Bukshpun et al. | |
| 2011/0047630 A1 * | 2/2011 | Cheng et al. | 726/34 |

FOREIGN PATENT DOCUMENTS

| | | |
|---|---|---|
| CN | 101198510 A | 6/2008 |
| CN | 101243686 A | 8/2008 |
| CN | 101345761 A | 1/2009 |
| CN | 101444096 A | 5/2009 |
| EP | 1841125 A1 | 10/2007 |
| EP | 2194257 A1 | 6/2010 |

(Continued)

OTHER PUBLICATIONS

SAE J2716: Single Edge Nibble Transmission for Automotive Applications (Jan. 1, 2010) (Http://storeihs.com).

(Continued)

*Primary Examiner* — Jeffrey Pwu
*Assistant Examiner* — Thong Truong

(57) ABSTRACT

Various embodiments relate to a tamper-proof vehicle sensor system and a related method for sending secure packets between components. A sensing unit may include an angular sensor, such as an anisotropic magnetoresistive (AMR) sensor, which determines the angular position of a magnetic field and produces related angle sensor data. The sensing unit may place the angle sensor data in a packet and may encrypt the packet using a selected encryption key. The sensor may append an encryption key identifier (ID) associated with the selected encryption key onto the packet and send the secure, unidirectional packet to an electrical control unit (ECU). The ECU may then use the appended encryption key ID to retrieve the selected encryption key to decrypt the packet. The ECU may then extract the angle sensor data from the packet to modify the configuration of the vehicle.

20 Claims, 3 Drawing Sheets

(56) References Cited

FOREIGN PATENT DOCUMENTS

| | | |
|---|---|---|
| WO | 2007053256 A1 | 5/2007 |
| WO | 2008/097202 A1 | 8/2008 |

OTHER PUBLICATIONS

Extended European Search Report issued on Apr. 24, 2012 in corresponding EP Application No. 11193599.5.

* cited by examiner

PAIRING OF ANGLE SENSOR AND ELECTRONIC CONTROL UNIT

TECHNICAL FIELD

Various exemplary embodiments disclosed herein relate generally to electronic vehicle controls.

BACKGROUND

Magnetic sensors, such as Anisotropic Magnetoresistance (AMR) sensors, Giant Magnetoresistance (GMR) sensors, and Hall-Effect sensors play an important role for contactless sensing in various vehicles, such as measurements in subsystems of motor vehicles. For example, AMR sensors may be regularly used for various applications in the vehicle's power-train by, for example, measuring the magnetic fields of various components and making determinations such as the throttle position, based on such measurements. During regular operation, the AMR sensor may compile data based on its measurements of a magnetic field and may send such data to an electrical control unit (ECU) within the vehicle. The ECU may then respond to the received data from the sensor by modifying one or more components within the vehicle, such as when an engine control module (ECM) changes the configuration of a device in the power-train. Such modifications by the ECU may be used by the vehicle to, for example, increase the vehicle's fuel efficiency, acceleration, or power output.

In modern vehicles, however, it is possible for users to tamper with and manipulate vehicle ECUs, such as the ECM. For example, the common practice of "chip tuning" involves the manipulation of the ECM or its related motor management software to increase the power output of the vehicle's engine. However, such unauthorized manipulation of ECUs may, for example, result in higher abrasion of engine components (which are not covered by the warranty) and may also make the vehicle more dangerous, as the vehicle may not have been designed to operated under the manipulated configuration. Manipulation of the ECU may therefore pose problems related to the vehicle's performance and safety, which may therefore decrease the value of the vehicle and cause problems for other drivers.

SUMMARY

Provided are embodiments that enable transmission of sensor information to an electrical control unit (ECU). In particular, various embodiments enable secure transmission of sensor data in a secure, unidirectional packet sent from a tamper-proof sensor to an ECU. A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a sensing unit that may comprise an angular position sensor that determines an angular position of a magnetic field and produces angle sensor data based on the determined angular position. The sensing unit may also comprise an encryption processor. The encryption processor may receive the angle sensor data from the angle position sensor, produce a secure unidirectional packet using a selected encryption key, and send the secure unidirectional packet to an electronic control unit (ECU) that decrypts that secure packet using the selected encryption key and responds to the angle sensor data.

Various embodiments may also relate to an electronic control unit (ECU) that may comprise a receiving interface that receives a secure unidirectional packet from a sensing unit, the secure unidirectional packet including angle sensor data encoded by the sensing unit using a selected encryption key. The angle sensor data may be produced by the angular position sensor when determining an angular position of the magnetic field. The ECU may also comprise a decryption processor that decrypts the secure unidirectional packet using the set encryption key, wherein the ECU responds to angle sensor data included in the decrypted unidirectional packet.

Various embodiments may also relate to a method that may comprise an angular position sensor in a sensing unit determining an angular position of a magnetic field. The method may also comprise the angular position sensor producing angle sensor data based on the determined angular position and an encryption processor in the sensing unit connected to the angular position sensor producing a secure unidirectional packet using a selected encryption key. The method may also comprise sending the secure unidirectional packet to an electrical control unit (ECU).

It should be apparent that, in this manner, various exemplary embodiments enable manipulation protection through sensor pairing. Particularly, by using a secure, unidirectional packet to send sensor data from a tamper-proof sensor and an ECU, manipulation of the vehicle may be avoided even when the ECU is compromised through tampering.

BRIEF DESCRIPTION OF THE DRAWINGS

In order to better understand various exemplary embodiments, reference is made to the accompanying drawings wherein.

DETAILED DESCRIPTION

Figure 1:
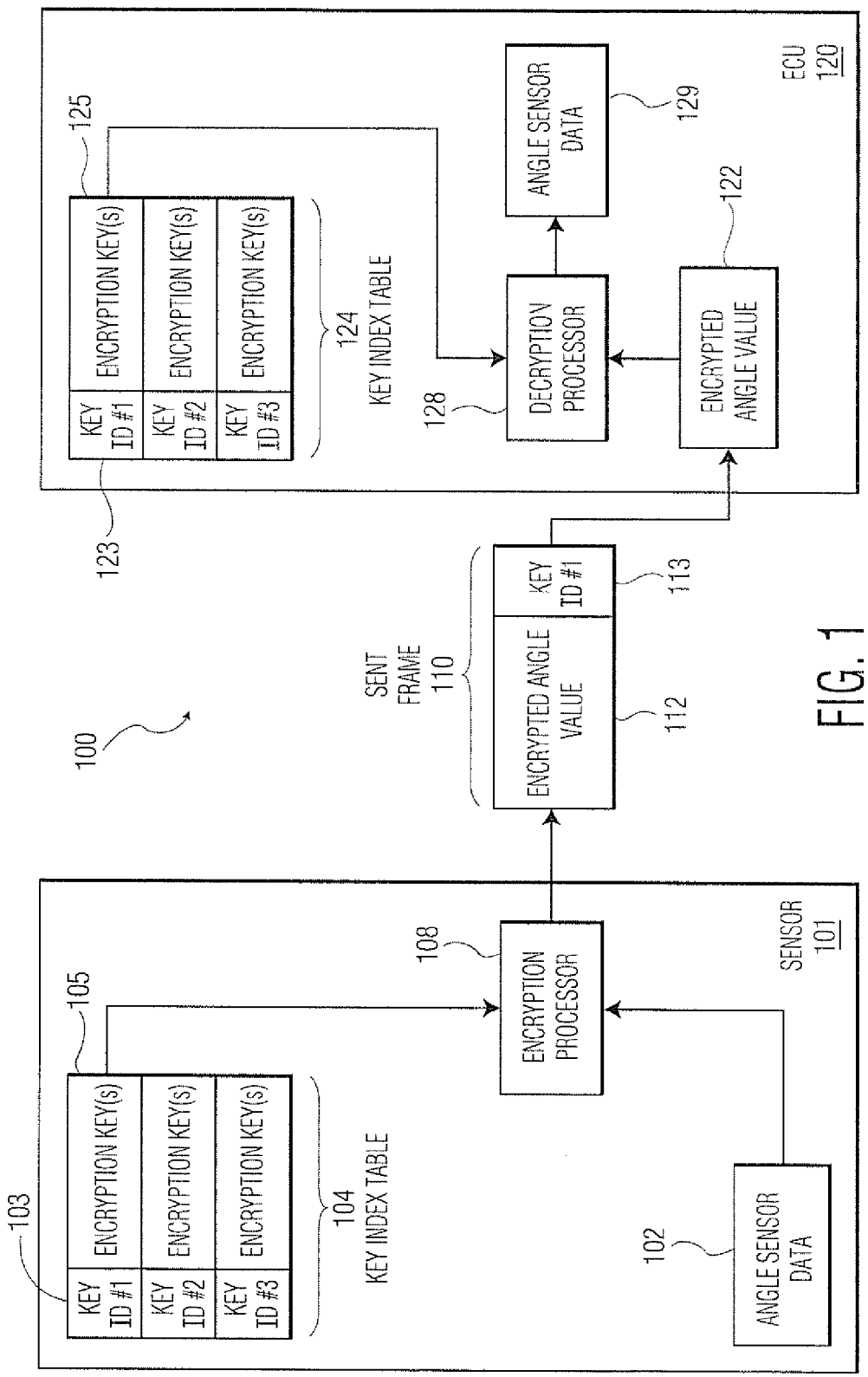
FIG. 1 illustrates an exemplary tamper-proof vehicle sensor system.

Referring now to the drawings, in which like numerals refer to like components or steps, there are disclosed broad aspects of various exemplary embodiments.

FIG. 1 illustrates an exemplary tamper-proof vehicle sensor system. Tamper-proof vehicle sensor system 100 includes a sensor 101, a SENT frame 110 and an electronic control unit (ECU) 120. Sensor 101 may include angle sensor data 102, a key index table 104 comprising encryption key identifiers (IDs) 103 and encryption keys 105, and an encryption processor 108. Single edge nibble transmission (SENT) frame 110 may include an encrypted angle value 112 and a selected encryption key ID 113. ECU 120 may include an encrypted angle value 122, a decryption processor 128, a key index table 124 comprising encryption key IDs 123, and encryption keys 125, and angle sensor data 129. Tamper-proof vehicle sensor system 100 may use encryption keys common in both of the key index tables 104, 124 to transfer secure, unidirectional packets from the sensor 101 to the ECU 120.

Sensor 101 may be hardware, or firmware, or similar, that may compile data based on measurements made within the vehicle. In some embodiments, the sensor 101 may comprise an angular sensor that measures the relative angular position of a component. In such instances, the sensor 101 may be, for example, a magnetic sensor such as an anisotropic magnetoresistive (AMR) sensor that measures the angular position of a magnetic field associated with a component, such as the magnetic field of a throttle in the engine of the vehicle. In alternative embodiments, the sensor 101 may comprise, for example, a giant magnetoresistive (GMR) sensor or a Hall-effect sensor that may measure a vehicle component through similar means. A person of ordinary skill in the art would be aware of like sensors for vehicle components. In some embodiments, the sensor 101 may be located in other areas of the vehicle and may therefore send other information to the ECU 120. For example, in some embodiments, the sensor 101 may be a wheel sensor that sends wheel data to the ECU 120. In alternative embodiments, the sensor 101 may comprise a different type of sensor that may compile data based on different measured values; for example, the sensor 101 may a temperature sensor that may send temperature information to the ECU 120.

In some embodiments the sensor 101 may, upon measurement of the angular position of the magnetic field of a component, generate angle sensor data 102. Angle sensor data 102 may comprise one or more quantitative values based on the measurements made by the sensor 101. In some embodiments, the angle sensor data 102 may include both measured values and calculated values associated with such measurements. For example, when the sensor 101 is measuring the angular position of the magnetic field of a throttle, the angle sensor data 102 may include the angle of the magnetic field and the angle of the throttle. In some embodiments, the sensor 101 may include a processor or a reduced instruction set computing (RISC) processor that may determine one or more of the calculated values based on the measurements of the sensor 101. For example, a processor in the sensor 101 may determine the fluid flow rate of the engine based on the determined throttle position. In alternate embodiments, the angle sensor data 102 may comprise data applicable to the measurement made by the sensor. For example, the data compiled by the sensor 101 comprising a temperature sensor may include at least temperature data.

Key Index Table 104 may comprise a series of key entries, with the Key Index Table 104 being stored in the sensor 101. In some embodiments, the Key Index Table 104 may be stored in a memory device, which may comprise, for example, a tangible machine-readable storage medium in the sensor. In some embodiments, the tangible machine-readable storage medium may be, for example, read-only memory (ROM) or another storage medium that may be tamper-proof after an initial writing. Key Index Table 104 may include a series of key entries that pair encryption key identifiers 103 with corresponding sets of encryption keys 105. In some embodiments, the sensor 101 may use the same selected encryption key 105 when encrypting the angle sensor data 102. In some of these instances, the selected encryption key 105 may be set during the manufacture of the sensor 101 and may be non-modifiable after the initial setting. This may make the sensor 101 tamper-proof, as the access to the encryption keys 105 may be limited and subsequent modifications would not be altered the selected encryption keys 105 used by the encryption processor 108. In some embodiments, the Key Index Table 104 may wholly comprise of a single key entry of the selected encryption key ID 103 and the selected encryption key 105. In alternate embodiments, the encryption processor 108 may use any of the encryption keys 105 included in the Key Index Table 104 when encrypting the angle sensor data 102.

Encryption key identifier (ID) 103 may be a value associated with one or more encryption keys 105 that the sensor 101 may use when encrypting the angle sensor data 102. Encryption processor 108 may retrieve a selected key entry from the Key index Table 104 and may encrypt the angle sensor data 102 with a selected encryption key 105, while appending the corresponding selected encryption key ID 103 to the resultant encrypted angle sensor data. The secure packet produced by the encryption processor 108 may therefore include an encrypted angle value 112 and the selected encryption key ID 113 that corresponds with the selected key ID 103.

Encryption key 105 may be one or more encryption keys in a key entry that the encryption processor 108 may retrieve from the Key Index Table 104. In some embodiments, the encryption key ID 103 for a key entry may be associated with multiple encryption keys 105. In such instances, the encryption processor 108 may then use one of the encryption keys 105 from the selected key entry when encrypting the angle sensor data 102. In some embodiments, the encryption processor 108 may select any of the encryption keys 105 of the selected key entry for a defined number or uses or for a defined period of time. In some embodiments, the encryption key 105 may be a secret key used only by the sensor 101 and the ECU 120 in the encryption and decryption of secure data packets. Access to the secret key may be limited to only authorized manufacturers of the sensor 101 and the ECU 120. A person of skill in the art would be aware of applicable keys that may be used by the encryption processor 108 when producing secure packets. For example, in the illustrative embodiment, encryption key 105 may comprise any encryption key that is regularly used by encryption processors in that implement symmetric-key encryption algorithms, such as, for example, Advanced Encryption Standard (AES) (i.e., Rijndael), Blowfish, Twofish, Serpent, and CAST5 algorithms.

Encryption processor 108 may be a processor, RISC processor, or microprocessor that receives the angle sensor data 102 and produces an encrypted angle value 112. In some embodiments, the encryption processor 108 may also produce the secure packet to be sent to the ECU 120, where the packet includes the encrypted angle value 112. Encryption processor 108 may retrieve a selected encryption key 105 from a key entry in the Key Index Table 104. In some embodiments, the selected encryption key 105 may be initially set during manufacture of the sensor 101 and may be non-modifiable afterwards. In such instances, the encryption processor 108 will always attempt to retrieve the same key entry. When retrieving the encryption key 105 from the Key Index Table 104, the encryption processor 108 may also retrieve the corresponding encryption key ID 103 from the same key entry. Upon retrieving the selected encryption key 105, the encryption processor 108 may use an encryption algorithm that is compatible with the selected encryption key 105 to produce the secure angle value 112. For example, when the selected encryption key 105 is an AES-128 cipher, the encryption processor 108 may use a Rijndael implementation to encrypt the angle sensor data 102 and produce the encrypted angle value 112. In some embodiments, the encryption processor 108 may not include all of the information included in the angle sensor data 102 when it produces the encrypted angle value 112. For example, the angle sensor data may include the measured angle value and the calculated throttle position. In such instances, the encryption processor 108 may only encrypt the measured angle value. In similar embodiments, the encryption processor 108 may encrypt similar data included in the angle sensor data 102. For example, when the sensor 101 is a temperature sensor, the encryption processor 108 may encrypt the measured temperature when the producing the encrypted data. In some embodiments, the ECU 120 may reconstruct other information that is from the subset of information included in the encrypted angle value 112.

Single-edge nibble transmission (SENT) frame 110 may be a packet produced by the sensor 101. In some embodiments, the SENT frame 110 may be a secure, unidirectional packet that compiles with the SAE J2716 protocol. In the illustrative embodiment, for example, the SENT frame 110 may only be sent from the sensor 101 to the ECU 120. In such instances, the secure, unidirectional packet may help to hamper manipulation, as SENT frame 110 may only be sent by the sensor 101. In some embodiments, the SENT frame 110 may not require a coordination signal from the ECU 120 to establish communication. When the sensor 101 sends the SENT frame 110, the SENT frame 110 may be transmitted as a series of pulses with data measured from falling edge to falling edge times of each pulse. While the illustrative embodiment employs the SENT frame 110 for secure transmission of sensor data to the ECU 120, a person of ordinary skill would be aware of other communications protocols and applicable packets that the sensor 101 may employ to send secure packets to the ECU 120.

In the illustrative embodiment, the SENT frame 110 includes both the encrypted angle value 112 and the selected encryption key ID 113. Encryption key ID 113 may correspond to the selected encryption key ID 103, which is associated by key entry in the Key Index Table 104 with the selected encryption key 105 chosen by the encryption processor 108. Encrypted angle value 112 may be produced by the encryption processor 108 using the selected encryption key 105 and may comprise a subset or all of the information included in the angle sensor data 102. In some embodiments, both the encrypted angle value 112 and the selected encrypted key ID 113 may be included in the payload of the SENT frame 110.

Electrical control unit (ECU) 120 may be an embedded system within a vehicle that controls an electrical subsystem of the vehicle. In the illustrative embodiment, for example, the ECU 120 may be an engine control module (ECM) (i.e., a power-train control module [PCM]) that may, for example, determine fuel levels and may control ignition timing to keep the vehicle's engine running. In the illustrative embodiment, the ECU 120 may comprise a processor or plurality of processors that receives data and measurements from a plurality of sensors 101 and may modify various vehicle parameters in response to the received data and measurements. For example, the ECU 120 may change the timing of the ignition in response to the measured angle value included in the encrypted angle value 122.

Key Index Table 124 in the ECU 120 may be a table similar to the Key Index Table 104 included in the sensor 101. In some embodiments, the Key Index Tables 104, 124 may be identical; in other embodiments, the Key Index Table 124 may be of a different size, containing a different number of key entries than that of the Key Index Table 104. For example, because the ECU 120 may receive packets from a plurality of sensors 101 that may use different encryption techniques and/or different encryption keys 105, the Key Index Table 124 may contain substantially larger quantity of key entries than the Key Index Table 104 of any one of the sensors 101. Similarly, the Key Index Table 124 may also include a larger quantity of key entries in order to enable interoperability with a wider range of sensors 101, as each manufacturer of the sensor 101 may only have access to a limited number of different secret encryption keys 105.

Key Index Table 124 may contain a plurality of key entries matching each of the key entries included in the Key Index Table 104 of the sensor 101. Each of the matching key entries comprises the same encryption keys 125 corresponding to the same encryption key identifiers 123. For example, the Key Index Table 124 may contain a key entry including an encryption key 125 and an encryption key ID 123 that matches the key entry including the selected encryption key 105 and the corresponding encryption key ID 103. Upon receipt of the SENT frame 110 through a receiving interface (not shown), the decryption processor 128 in the ECU 120 may use the encryption key ID 113 included in the SENT frame 110 to identify and retrieve its corresponding encryption key 125 in the Key Index Table 124, which the decryption processor 128 may then use to decrypt the encrypted angle value 122 included in the SENT frame 110.

Decryption processor 128 may be a processor, RISC processor, or microprocessor similar to the encryption processor 108 of the sensor 101 that uses various decryption algorithms on the encrypted angle value 122 to retrieve the information encrypted by the encryption processor 108. In the illustrative embodiment, for example, the decryption processor 128 may use the same symmetric-key algorithm employed by the encryption processor 108 when producing the encrypted angle value 112. Decryption processor 128 may receive the encrypted angle value 122 through the receiving interface (not shown), which may correspond to the encrypted angle value 112 included in the SENT frame 110. In some embodiments, the decryption processor 128 or other module within the ECU 120 may extract the encrypted angle value 122 and the selected encrypted key ID 113 from the payload of the SENT frame 110.

Decryption processor 128 may use the retrieved selected encryption key ID 113 to retrieve the corresponding key entry from the Key Index Table 124. Upon finding a matching key entry in the Key Index Table 124, the decryption processor 128 may use the retrieved encryption key 125, which in the illustrative embodiment is identical to the selected encryption key 105, to decrypt the encrypted angle value 122. Decryption processor 128 may then produce the angle sensor data 129 as a result of the decryption algorithm. In the illustrative embodiment, the angle sensor data 129 may be equivalent to the angle sensor data 102 produced by the sensor 101. In such instances, the encryption processor 108 produced the encrypted angle value 112 that included all the information comprising the angle sensor data 102. As a result, all the information was sent in the SENT frame 110 to the ECU 120, which extracted the information using the corresponding encryption key 125. In alternative embodiments, the angle sensor data 129 may be a subset of information included in the angle sensor data 102 that the encryption processor 108 included in the encrypted angle value 112.

In some embodiments, the ECU 120 may then respond to the angle sensor data 129 by adjusting various parameters it controls, such as the throttle position or the ignition timing. Tampering of the ECU 120 may be avoided due to the limited access to the key entries of the Key Index Table 124. As, in some embodiments, manipulation of the ECU 120 may prevent retrieval of the encryption key 125, a tampered ECU 120 may not be able to successfully decrypt the encrypted angle value 122.

Figure 2:
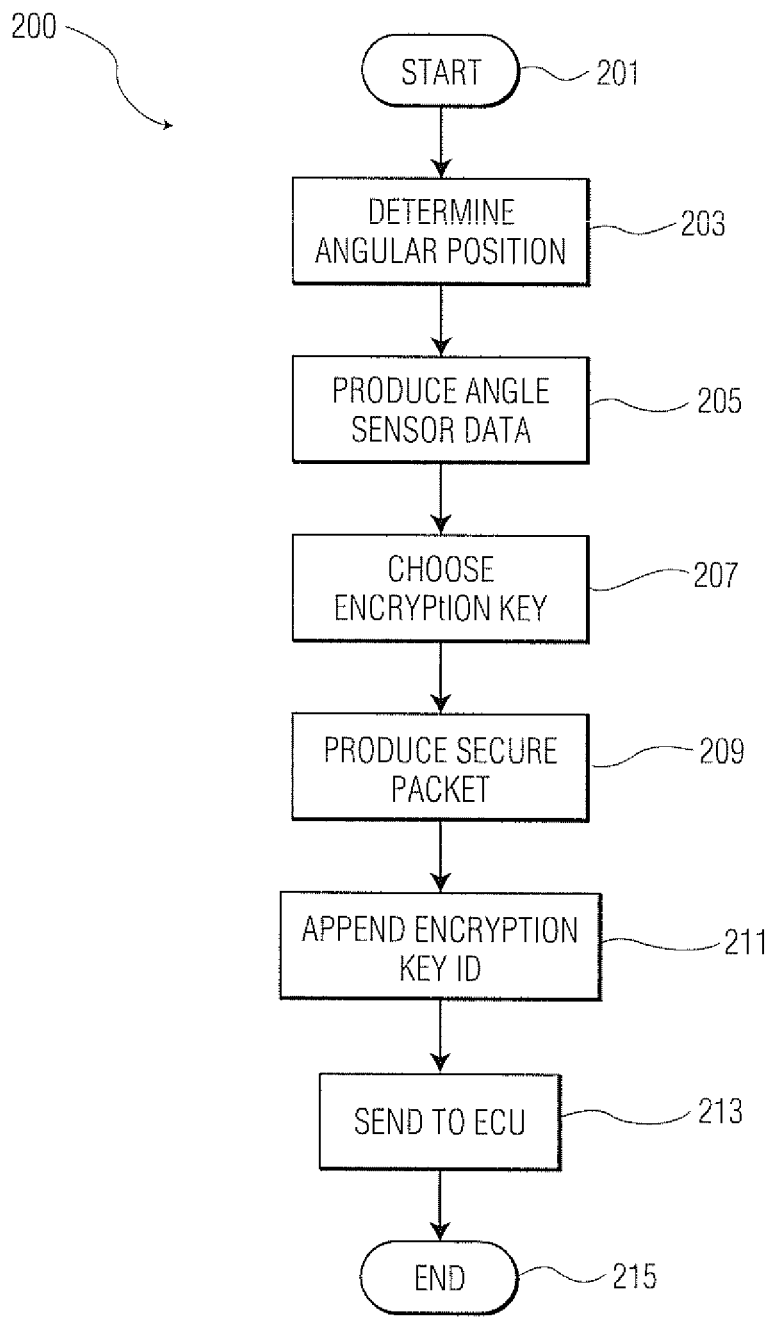
FIG. 2 illustrates an exemplary flowchart of a sensor sending a secure, unidirectional packet to an electronic control unit (ECU)

FIG. 2 illustrates an exemplary flowchart of a sensor sending a secure, unidirectional packet to an electrical control unit (ECU). Method 200 may be deployed by, for example, the sensor 101 when preparing the SENT frame 110 to transmission to the ECU 120. Method 200 may begin at step 201 and proceed to step 203, where the angular position is determined. In some embodiments, the sensor 101 may determine the angular position of the magnetic field, which may have a specific relationship with other devices, such as the throttle position. Method 200 may then proceed to step 205, where angle sensor data is produced. In some embodiments, the angle sensor data 102 produced may include information such as the measured angular position. In some embodiments, the information included in the angle sensor data may also include other associated values, such as the throttle position that was calculated based on the measured angle value.

In step 207, the encryption processor 108 of the sensor 101 may choose a selected encryption key 105. In some embodiments, this step may comprise retrieving an encryption key 105 and its corresponding encryption key ID 103 from a key entry in the Key Index Table 104 included in the sensor 101. In some embodiments, the selected encryption key 105 may be initially set during manufacture of the sensor 101 and may be non-modifiable after the initial setting. In such instances, the encryption processor 108 may in step 207 always retrieve the same selected encryption key 105.

Encryption processor 108 may then proceed to step 209 and produce a secure packet. In some embodiments, the encryption processor 108 may use the selected encryption key 105 retrieved in step 207 to encrypt the angle sensor data 102 produced in step 205. In some embodiments, the encryption processor 108 may only encrypt a subset of information included in the angle sensor data 102. Encryption processor 108 may include the resultant encrypted angle value 112 in a secure packet. In some embodiments, the secure packet may be a secure, unidirectional packet, such as a secure SENT frame 110 that includes the encrypted angle value 112.

In step 211, the encryption processor 108 may append the selected encryption key ID 113 to the secure packet. In some embodiments, the selected encryption key ID 113 may correspond to the selected encryption key ID 103 and may be appended to the encrypted angle value 112 within the payload of the secure packet. Sensor 101 may then proceed to step 213 and send the secure packet to the ECU 120; method 200 may then end at step 215.

Figure 3:
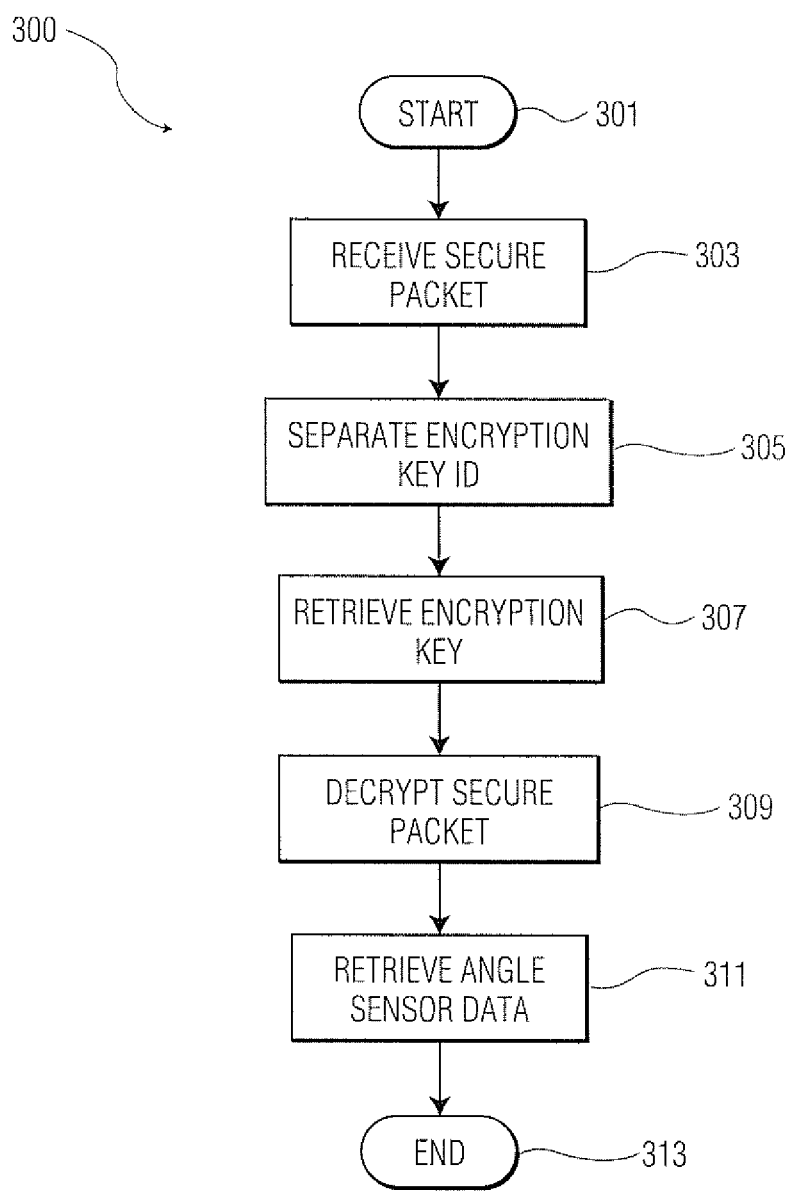
FIG. 3 illustrates an exemplary flowchart for an ECU receiving a secure, unidirectional packet to retrieve information.

FIG. 3 illustrates an exemplary flowchart for an electrical control unit (ECU) receiving a secure, unidirectional packet to retrieve information. Method 300 may be employed by, for example, the ECU 120 upon receipt of a secure, unidirectional packet from a sensor 101. In alternative embodiments, the ECU 120 may employ method 300 on any received secure packet that includes an encryption key identifier 113. Method 300 may begin at step 301 and proceed to step 303, where the ECU 120 may receive the secure packet. For example, a receiving interface in the ECU 120 may receive a secure, unidirectional packet in the form of the SENT frame 110 from the sensor 101. ECU 120 may then proceed to step 305, where the ECU 120 separates the encryption key ID 113 from the encrypted angle value 112.

In step 307, the decryption processor 128 of the ECU 120 may retrieve the selected encryption key 125. In some embodiments, the decryption processor 128 may use the encryption key ID 113 extracted in step 305 to find a corresponding key entry in the Key Index Table 124 that contains an equivalent encryption key ID 123. Upon finding a matching key entry, the decryption processor 128 may then retrieve the corresponding encryption key 125 included in the matching key entry. In some embodiments, the corresponding encryption key 125 may be equivalent to the selected encryption key 105 used by the encryption processor 108 of the sensor 101 to produce the encrypted angle value 112.

Decryption processor 128 may then proceed to step 309 by decrypting the secure packet. In some embodiments, the decryption processor 128 may receive the encrypted angle value 122 that is equivalent to the encrypted angle value 112 included in the SENT frame 110. Decryption processor may use the encryption key 125 retrieved in step 307 to decrypt the encrypted angle sensor value 122.

ECU 120 may then proceed to step 311, where the angle sensor data 129 is retrieved as a result of the decryption in step 309. In some embodiments, the angle sensor data 129 retrieved may be a subset of information included in the angle sensor data 102 produced by the sensor 101. In such instances, the ECU 120 may produce information that was not included in the encrypted angle value 122. For example, if the angle sensor data 102 included the measured angle value of the magnetic field and the calculated throttle position, the encryption processor 108 may only send the measured angle position in the encrypted angle value 112. ECU 120 may then calculate the throttle position using the same measured angle value; method 300 may then end at step 313.

It should be apparent from the foregoing description that various exemplary embodiments of the invention may be implemented in hardware and/or firmware. Furthermore, various exemplary embodiments may be implemented as instructions stored on a tangible machine-readable storage medium, which may be read and executed by at least one processor to perform the operations described in detail herein. A tangible machine-readable storage medium may include any mechanism for storing information in a form readable by a machine, such as a personal or laptop computer, a server, or other computing device. Thus, a tangible machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A sensing unit comprising:
   an angular position sensor that is configured to determine an angular position of a magnetic field and produce angle sensor data based on the determined angular position; and
   a data store for storing a key identifier index table, the key identifier index table is configured to store a selected encryption key identifier (ID) and one or more encryption keys associated with the key identifier, wherein a data stored in the key identifier index table is un-modifiable after an initial setting; and an encryption processor coupled to the data store, wherein the encryption processor is configured to receive the angle sensor data from the angular position sensor, produce a secure unidirectional packet using a selected encryption key retrieved from the key identifier index table to encrypt the angle sensor data through an encryption algorithm that is determined based on the selected encryption key, and send the secure unidirectional packet to an electronic control unit (ECU) that decrypts the secure unidirectional packet using the selected encryption key and responds to the angle sensor data.

2. The sensing unit of claim 1, wherein the encryption processor is further configured to append the selected encryption key identifier (ID) associated with the selected encryption key to the secure unidirectional packet before sending.

3. The sensing unit of claim 2, further comprising:
a memory device including a first Key Index Table, the first Key Index Table comprising a plurality of key entries associating an encryption key ID with at least one encryption key, wherein the encryption processor is configured to look up a first key entry in the first Key Index Table that includes the selected encryption key and the selected encryption key ID before appending the selected encryption key ID to the secure, unidirectional packet.

4. The sensing unit of claim 3, wherein the ECU contains a second Key Index Table that includes the first key entry, and the ECU looks up the first key entry in the second Key Index Table before decrypting the secure, unidirectional packet using the selected encryption key.

5. The sensing unit of claim 1, wherein the secure, unidirectional packet comprises a single-edge nibble transmission (SENT) frame.

6. The sensing unit of claim 1, wherein the selected encryption key used by the encryption processor is set during manufacture of the sensor and is non-modifiable after the initial setting.

7. The sensing unit of claim 1, wherein the angular position sensor comprises one of: an anisotropic magnetoresistive (AMR) sensor, a giant magnetoresistive (GMR) sensor, and a Hall-effect sensor.

8. An electronic control unit (ECU) comprising:
a receiving interface that receives a secure unidirectional packet from a sensing unit, the secure unidirectional packet including angle sensor data encoded by the sensing unit using a selected encryption key, wherein the angle sensor data is produced by an angular position sensor when determining an angular position of a magnetic field;
a data store for storing a key identifier index table, the key identifier index table is configured to store a selected encryption key identifier and one or more encryption keys associated with the selected encryption key identifier, wherein a data stored in the key identifier index table is un-modifiable after an initial setting; and
a decryption processor that decrypts the secure unidirectional packet using the set encryption key through an decryption algorithm that is determined based on the set encryption key, wherein the ECU responds to the angle sensor data.

9. The ECU of claim 8, wherein the secure unidirectional packet further comprises the selected encryption key identifier (ID) associated with the selected encryption key.

10. The ECU of claim 9, further comprising:
a memory device including a first Key Index Table, the first Key Index Table comprising a plurality of key entries associating an encryption key ID with at least one encryption key, wherein the decryption processor looks up a first key entry in the first Key Index Table that includes the selected encryption key and the selected encryption key ID before decrypting the secure unidirectional packet with the selected encryption key.

11. The ECU of claim 8, wherein the selected encryption key used by the sensor is initially set during manufacture of the sensor and is non-modifiable after the initial setting.

12. The ECU of claim 8, wherein the secure, unidirectional packet comprises a single-edge nibble transmission (SENT) frame.

13. A method comprising:
determining, by an angular position sensor in a sensing unit, an angular position of a magnetic field;
producing, by the angular position sensor, angle sensor data based on the determined angular position;
retrieving a selected encryption key from a key index table maintained inside the sensing unit, the key index table includes an encryption identifier, wherein data stored in the key index table is un-modifiable after an initial setting;
producing, by an encryption processor in the sensing unit connected to the angular position sensor, a secure, unidirectional packet using the selected encryption key to encrypt, through a selected encryption algorithm that is selected based on attributes of the selected encryption key, the angle sensor data; and
sending the secure, unidirectional packet to an electrical control unit (ECU).

14. The method of claim 13, further comprising:
appending, by the encryption processor, a selected encryption key identifier (ID) associated with the selected encryption key to the secure, unidirectional packet before the sending step.

15. The method of claim 14, further comprising:
searching, by the encryption processor, a first key entry in a first Key Index Table for a first key entry in the first Key Index Table that includes the selected encryption key and the selected encryption key ID before appending the selected encryption ID to the secure, unidirectional packet, wherein the sensing unit further comprises a memory device including the first Key Index Table comprising a plurality of key entries associating encryption key IDs with encryption keys.

16. The method of claim 15, further comprising:
receiving, by the ECU, the secure, unidirectional packet from the sensing unit;
decrypting, by the ECU, the secure, unidirectional packet using the selected encryption key; and
responding to the angle sensor data.

17. The method of claim 16, further comprising:
searching, by the ECU, the first key entry in a second Key Index Table that includes the selected encryption key and the selected encryption key ID before decrypting the secure, unidirectional packet with the selected encryption key.

18. The method of claim 13, wherein the selected encryption key used by the sensing unit is set during manufacture of the sensor and is non-modifiable after the initial setting.

19. The method of claim 13, wherein the secure, unidirectional packet comprises a single-edge nibble transmission (SENT) frame.

20. The method of claim 13, wherein the angular position sensor comprises one of: an anisotropic magnetoresistive (AMR) sensor, a giant magnetoresistive (GMR) sensor, and a Hall-effect sensor.

* * * * *